United States Patent
Krishnaprasad et al.

(10) Patent No.: US 8,117,156 B2
(45) Date of Patent: Feb. 14, 2012

(54) REPLICATION FOR COMMON AVAILABILITY SUBSTRATE

(75) Inventors: Muralidhar Krishnaprasad, Redmond, WA (US); Anil K. Nori, Redmond, WA (US); Lu Xun, Kirkland, WA (US); Anurag Gupta, Bellevue, WA (US); Manoj Valiyaparambil, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 12/420,364

(22) Filed: Apr. 8, 2009

(65) Prior Publication Data

US 2010/0114824 A1  May 6, 2010

Related U.S. Application Data

(60) Provisional application No. 61/108,522, filed on Oct. 26, 2008.

(51) Int. Cl.
G06F 17/30 (2006.01)
(52) U.S. Cl. ......... 707/637; 711/144; 711/143; 711/141
(58) Field of Classification Search ............. 707/637; 711/133, 141, 143, 144
See application file for complete search history.

(56) References Cited

U.S. PATENT DOCUMENTS

| | | | |
|---|---|---|---|
| 6,026,413 A * | 2/2000 | Challenger et al. ........... 717/108 |
| 6,487,562 B1 | 11/2002 | Mason, Jr. et al. | |
| 6,654,771 B1 | 11/2003 | Parham et al. | |
| 6,772,178 B2 | 8/2004 | Mandal et al. | |
| 7,275,142 B1 | 9/2007 | Schultz et al. | |
| 7,334,062 B1 | 2/2008 | Agarwal et al. | |
| 7,617,369 B1 * | 11/2009 | Bezbaruah et al. ........... 711/162 |
| 2008/0140962 A1 | 6/2008 | Pattabiraman et al. | |
| 2009/0144388 A1 * | 6/2009 | Gross et al. .................. 709/213 |
| 2010/0106914 A1 * | 4/2010 | Krishnaprasad et al. ..... 711/143 |

OTHER PUBLICATIONS

Thomas et al., "Architecture of the Ficus Scalable replicated file system", Mar. 1991.*
Data Sharing Solutions. http://www.informatik.uni-leipzig.de/ti/os390/book/os390/filesyst/filesys1.pdf. Last accessed Nov. 11, 2008.
Yu, et al. Consistent and Automatic Replica Regeneration. http://www.comp.nus.edu.sg/~yuhf/nsdi04final/nsdi04.pdf. Last accessed Nov. 11, 2008.
Intransa, Inc. Understanding Controller-based Replication VS. Host-based Replication. 2005. http://www.ppma.com/IntransaWhitePaper/All/controller_vs_host.pdf. Last accessed Nov. 11, 2008.
Grimm, et al. Revisiting Structured Storage: A Transactional Record Store. http://pages.cs.wisc.edu/~swift/papers/tr00-04-01.pdf. Last accessed Nov. 11, 2008.

* cited by examiner

Primary Examiner — Jean M Corrielus
(74) Attorney, Agent, or Firm — Zete Law, P.L.L.C.; MacLane C. Key

(57) ABSTRACT

Systems and methods that supply a replication layer/agent that is generic to supporting a plurality of storage configuration as part of a distributed store. Such distributed store employs a Common Availability Substrate (CAS) for data transport and consistency, to render the distributed store scalable and available. Such an arrangement enables continuous operation of the store, while the replication subsystem creates new replicas (e.g., for load balancing, failover, and the like).

20 Claims, 11 Drawing Sheets

REPLICATION FOR COMMON AVAILABILITY SUBSTRATE

CROSS REFERENCE TO RELATED APPLICATIONS

This application claims the benefit of U.S. Provisional Application No. 61/108,522 filed on 26 Oct. 2008 entitled "REPLICATION FOR COMMON AVAILABILITY SUBSTRATE", the entirety of this application is hereby incorporated by reference. This non-provisional application further relates to U.S. patent application Ser. No. 12/363,505 filed on 30 Jan. 2009, entitled "DISTRIBUTED CACHE ARRANGEMENT", all of the aforementioned patent applications are incorporated herein by reference in their entireties.

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

Typically, a continuing problem in computer systems remains handling of the growing amount of information or data available. The sheer amount of information being stored on disks or other media for databases in some form has been increasing dramatically. While files and disks were measured in thousands of bytes a few decades ago, now databases of a million megabytes (terabytes) and even billions of megabytes are being created and employed in day-to-day activities.

Furthermore, today applications run on different tiers, in different service boundaries, and on different platforms (e.g. server, desktop, devices). For example, in a typical web application, many applications reside on a server supporting a large number of users; however, some client components of the application can run on desktops, mobile devices, and web browsers, and the like. In addition, advances in connectivity and cheap storage combined with the complexity of software management facilitate on-line services and software-as-a-service. In such services models, applications (and their data) are hosted in central data centers (e.g., referred to as the "cloud") and are accessible and shared over the web.

The distributed applications require support for large number of users, high performance, throughput and response time. Such services orientation also requires the cost of service to be low, thereby requiring the scalability and performance at low cost.

A further challenge in implementing storage systems is support for distribution and heterogeneity of data and applications. Applications are composing (e.g. mashups) data and business logic from sources that can be local, federated, or cloud-based. Composite applications require aggregated data to be shaped in a form that is most suitable for the application. Data and logic sharing is also an important requirement in composite applications.

As explained earlier, data/applications can reside in different tiers with different semantics and access patterns. For example, data in back-end servers/clusters or in the cloud tends to be authoritative; data on the wire is message-oriented; data in the mid-tier is either cached data for performance or application session data; and data on the devices can be local data or data cached from back-end sources. With the costs of memory falling, considerably large caches can be configured on the desktop and server machines. With the maturity of 64-bit hardware, 64-bit CPUs are becoming mainstream for client and server machines. True 64-bit architectures support 64-bit CPUs, data or address buses, virtual addressability and dramatically increase memory limits (to $2^{64}$ bytes). Operating systems (e.g. Windows, Linux) are also upgraded to support and take advantage of 64 bit addressspace and large memories. For example, desktops can be configured with 16 GB RAM, and servers can be configured with up to 2 TB of RAM. Large memory caches allow for data to be located close to the application, thereby providing significant performance benefits to such applications. In addition, in a world where hundreds of gigabytes of storage is the norm, the ability to work with most data in memory (large caches), and readily shift such data from tables/trees to graphs of objects is the key to programmer productivity for next generation applications. Moreover, supplying replication capability to highly available store remains limited to specific type of storage mediums, and is not readily designed for generic use and optimized for substantially high latency requirements.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation replicates data throughout a distributed store that is formed by a cluster of nodes (e.g., a plurality of networked machines)—via a replication layer generic to various storage configurations. Such storage configurations employ a Common Availability Substrate (CAS) as part of operations for data transport/consistency, to render the distributed store scalable and available, and to further supervise join/leave operations for nodes of the cluster. Accordingly, the CAS implemented as part of the distributed store can monitor health of nodes, manage life cycle of nodes, create primary/secondary nodes, and overall manage data transport/consistency operations.

In a related aspect, the replication layer further employs a replication agent component and a reconfiguration agent component, which facilitate replication of data to various nodes of the cluster as part of the distributed store. In one aspect, the replication agent component employs a replication queue that includes data items to be replicated, wherein such replication agent component is called upon by the distributed store to manage data replications forwarded thereto. Moreover, a routing table can subsequently direct replicated data to a node(s) in the cluster, which in part forms the distributed cache. In one aspect, the replication agent component can obtain data to be replicated, and employ the replication queue for replication to a secondary node(s). Next, and upon receipt of acknowledgement from such secondary node(s), the data can be committed to the store. Likewise, the reconfiguration agent component can update information related to configurations of nodes in the cluster such as designations of nodes as primary nodes to reflect most updated version of data, designation of nodes as secondary that represent back ups for the data, and the like.

Moreover, a set of generic API/control flow for store-replication interface are supplied, which enable a compliant store to become a distributed store (e.g., automatically), and hence benefit from advantages associated therewith (e.g., scale, availability, and the like). The API enables continuous operation of the store, while the replication subsystem creates new replicas (e.g., for load balancing, failover, and the like). Such an arrangement permits replication to further continue while the reconfiguration of the partition is occurring. Furthermore, if the store is deemed idempotent, the replication operations can occur in parallel without serializing the operations; hence further improving performance. As such, general purpose interfaces are defined that can be implemented by a store to participate in the distributed environment.

According to a further aspect, the subject innovation improves latency and availability of the distributed store, wherein if the overall system decides that a new replica is to be created, the replication layer can be called to perform required copy and move operations associated therewith. In conventional systems to complete the replication, such operation can shutdown the specific partition on which the replication is being performed for updates—yet the subject innovation enables the system to start enumerating the partition data while the operations are still continuing. Such can be accomplished by noting the current sequence number for operations (e.g., a logical sequence number—LSN) before the enumeration is begun; and typically returning those items in the partition wherein associated LSN is less than the start LSN. All current operations that are occurring will continue to obtain higher LSNs and are added to the queue. The replication system can initially processes the copy operations, and subsequently drain the queue of all operations beyond the start LSN. Accordingly, the application can mitigate losses associated with availability and idempotency.

Likewise, if the distributed store can handle idempotency on the receiving side (e.g., if same operation is being repeated twice, the second operation can be ignored), the replication layer can send operations in parallel without a requirement for sequencing thereof. Such can substantially improve performance as the system need not wait for the operations to be acknowledged in sequence. Accordingly, manner that the queues are employed enable the system to continue to run, and if there are other nodes to which the data should be replicated to—then such process continues to occur.

In accordance with a further aspect, the receiving side can return an acknowledgement when receiving message in a queue associated therewith (and hence does not have to wait to apply the operation.) In case where the messages are being sent out of order (idempotency), then a queue is also not required on the receiving side.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
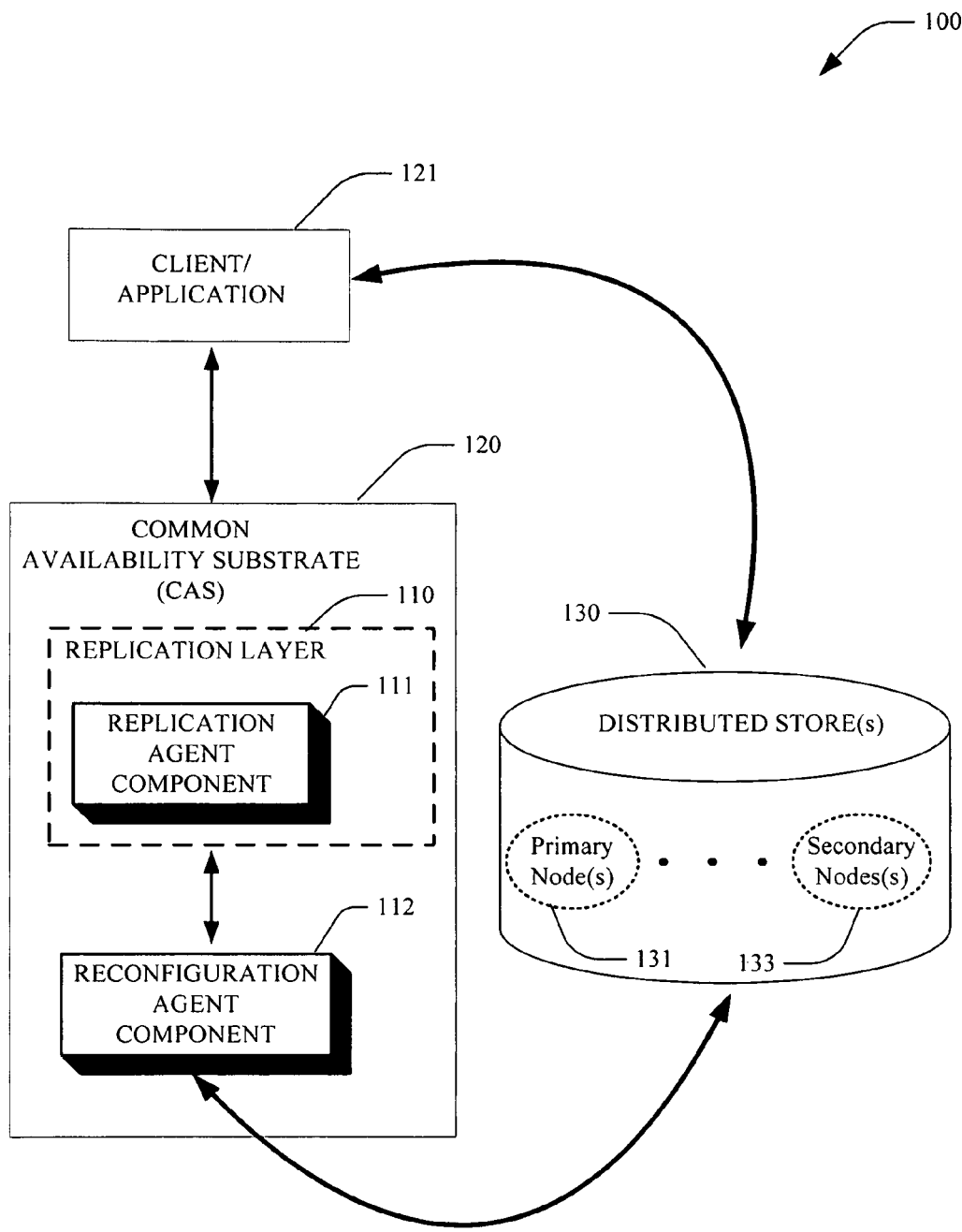
FIG. 1 illustrates a system block diagram of a distributed store that implements a replication layer according to a particular aspect of the subject innovation.

FIG. 1 illustrates an exemplary system 100 that replicates data throughout a distributed store 130, which is formed by a cluster of nodes (e.g., plurality of networked machines)—via a replication layer 110. The replication layer 110 is generic to a plurality of storage configurations and distributed stores that interact with the Common Availability Substrate (CAS) 120—which itself further interacts with the environment of the distributed store 130. The CAS 120 provides the distributed store 130 with data transport and consistency operations to render the system 100 scalable and available, and further supervises join/leave operations for nodes that in part form the distributed store 130 (e.g., monitoring health of nodes, managing life cycles of nodes, creating a primary node on another machine). As will be described in detail with reference to FIG. 2, the replication layer 110 can further employ a replication agent component 111 and a reconfiguration agent component 112 that facilitate replication of data as part of the distributed store 120. The replication layer 110 further supplies a set of generic API/control flow for store-replication interface, which enables a compliant store to function (e.g., automatically) as the distributed store 130, and hence benefit from advantages associated therewith (e.g., scale, availability, and the like). Such API can be additionally structured to enable continuous operation of the distributed store 130, while the replication layer 110 creates new replicas (e.g., for load balancing, failover, and the like). This arrangement further permits replications to continue while the reconfiguration of the partition is occurring.

Furthermore, if the distributed store 130 is idempotent, the replication operations can occur in parallel without serializing the operations; hence further improving performance. Accordingly, general purpose interfaces are defined that can be implemented by a generic store to participate in the distributed store 130. The following discussion further describes in detail typical interactions with the replication layer 110 and associated data operations.

Interactions With the Replication Layer 110

In one aspect, the distributed store 130 can also be positioned on top of the CAS 120, and include a plurality of partitions such as data partitions—which can be formed since data is partitioned across the distributed store 130. Moreover, on the primary node 131—(which represents a node that contains most current/up-to-date version of the data)—the data store passes write requests to the replication layer 110 and relies on the replication layer 110 to replicate the operation to the secondary nodes that contain the secondary replicas. The replication layer 110 can also inform the distributed store 130 when a quorum of the secondary replicas have acknowledged that they have processed the operation, such that the distributed store 130 can acknowledge to the client/application 121 that the write request is successful. On the secondary replicas/secondary nodes 133, the replication layer 110 passes the replication operations to the distributed store 130 in the same order that associated operations are processed on the primary node 131.

The replication layer 110 further interacts with the secondary nodes 133 and associated replicas, via the primary node 131. In general, a secondary replica/secondary node 133 requires to ACK an operation that is received from the primary when it knows that such operation has been processed by the distributed store 130, or that such operation will be applied by the store successfully. Such interactions can occur on top of a communication layer (not shown) that provides for failure detection of nodes (e.g., designated primary or secondary) and a reliable message delivery therebetween. The replication layer 110 can also interact with the reconfiguration agent component 112 that can create or terminate various primary-secondary replication sessions.

Data Operations

The concept of data operation represents a significant factor to operation of the replication layer 110 activities. Conceptually, a data operation represents a manner the distributed store 130 can replicate some of its data to another data store, depending on requirements thereof. Put differently, the distributed store 130 on the receiving side requires an understanding on how to interpret and apply operations supplied from the sending side.

From perspective of the CAS 120, every operation created by the distributed store 130 can implement the marker interface IDataOperation, wherein a data operation requires it to be serializable. In one aspect, type of the data operation can be serialized/deserialized by NetDataContractSerializer, for example. It is to be appreciated that since the serialization can occur when the replication layer 110 actually sends out the replication message, the store should ensure that any data operation it passes to the CAS layer is read-only.

The CAS 120 can further define two derived interfaces from IDataOperation, namely:

IReplicationOperation: a replication operation being employed for replicating a client/application 121 write request. (It is to be appreciated that the distributed store 130 can further batch several operations into a single IReplicationOperation, yet such operations have to be processed and acknowledged as a single operation from CAS perspective). Moreover, a sequence property can be defined for this interface, wherein such sequence starts from I for every partition and can increment by one for the next operation—no gap can exist, unless there is a data loss. The store on the primary can determine the order of the operations to be replicated from the sequence number of every operation.

ICopyOperation: a copy operation can be employed to build a replica from scratch. Since the primary node 131 typically does not keep the history for every replication operation (starting from sequence number 1), it will not be able to use IReplicationOperation only to build a new replica, or a replica that is too far behind. In such case, the distributed store 130 can enumerate all data in a partition and send as copy operations to the new replica. It is to be further appreciated that the distributed store 130 can decide manner of grouping its data into one or multiple copy operations, as ICopyOperation is also a marker interface. Copy operations can further be sequenced by the CAS layer 120.

Replicating Client Requests

In one aspect, it can be assumed that a partition is already performing properly with one primary node and n secondary replicas (n being an integer). When a client request arrives at the store, initially the store can call the CAS 120 to check whether it can serve the request (by calling IsReadable or IsWritable, depending on the type of the request). If CAS 120 determines that the store cannot process the request, the store typically rejects the request. Likewise, if the request is granted and it is a read request, the store can serve the request directly. It is to be appreciated that for Write requests any updates is replicated, wherein the store typically represents the write request by employing an IReplicationOperation, assigns a sequence number to it, and passes it to the CAS replication layer. As such, since the request has not been written to the quorum of replicas (unless the quorum size is 1), the store typically does not allow clients to observe the pending updates and therefore requires taking a lock on the data being updated (unless reading uncommitted data is acceptable). One can indicate that an operation is committed, from the client perspective, after it is written to a quorum of replicas. It is to be appreciated that as used herein, the term "commit" does not solely refer to whether the operation is locally committed in the store, and can also refer to an operation that is written to a quorum of replicas.

Likewise, when the replication operation is passed to the replication layer 110, it can be placed into a "store operation queue". Subsequently, the replication layer 110 can then send it to every replica and further await for a corresponding ACK from each such node. Accordingly, when a write quorum of ACK has been received (counting the primary itself), the replication layer 110 can notify the store that this operation is committed and the store can now send acknowledgement to the client. At this stage, the replication layer 110 still cannot remove the operation from the queue until all replicas have acknowledged it. If the primary has waited long enough for an ACK from a replica, it will first check whether the replica is known to be down. If so, it will not attempt to resend the operation. Otherwise, it will ask the cluster layer, also referred to as the fabric layer (not shown), to check whether the remote node is down. Such cluster layer or fabric layer can establish clustering protocols among the plurality of nodes that form the distributed store 130. For example, when a node is to join or leave the cluster, requisite operation for adding or leaving the cluster are managed.

Moreover, the cluster layer can return immediately with its current knowledge of the remote node. And if the node is not known to be down, the cluster or fabric layer can send a probe message asynchronously to the node if there is no probe message in progress for the same node. The probe message can eventually notify fabric reliably whether the remote node is down or not—(such that if the replication layer consults the fabric layer during a next period, it is very likely that such fabric layer or cluster layer can inform the replication layer that the node is down, if the probe message result comes back in time). The replication layer can resend the operation to the replica after a wait interval if it is not known to be down. For example, immediately before replication layer sends out a retry, it can check the local knowledge again to determine whether the node is now known to be down. Yet, the cluster layer or fabric layer is notified not to send out the probe message.

Furthermore, the primary node for every partition can create an output connection for every replica. Hence, a substantially large number of partitions can have the same secondary, and there exists numerous connections between the same pair of nodes. It is responsibility of communication layer to share the actual communication channels, and from the replication layer's perspective, the replication layer possesses its own connection for each replica in each partition.

In addition, when the store attempts to push a replication operation to the replication layer, in particular cases it can be rejected (even though the IsWritable check returned true, as situations have changed after the check). Examples of such rejection can include:

The "store operation queue" is full. Such can occur if there is one or more replica that is extremely slow to respond.
The replica has changed its role from primary to secondary and therefore can no longer process the request.
The CAS layer has not completed its initialization of its data structures for this partition and is therefore not ready to accept the operation yet (e.g., when implementation of IsWritable does not take a lock).

The replication layer can exhibit different exception for such errors and the store can choose to wait and retry for transitional errors (e.g. when the queue is full).

Figure 2:
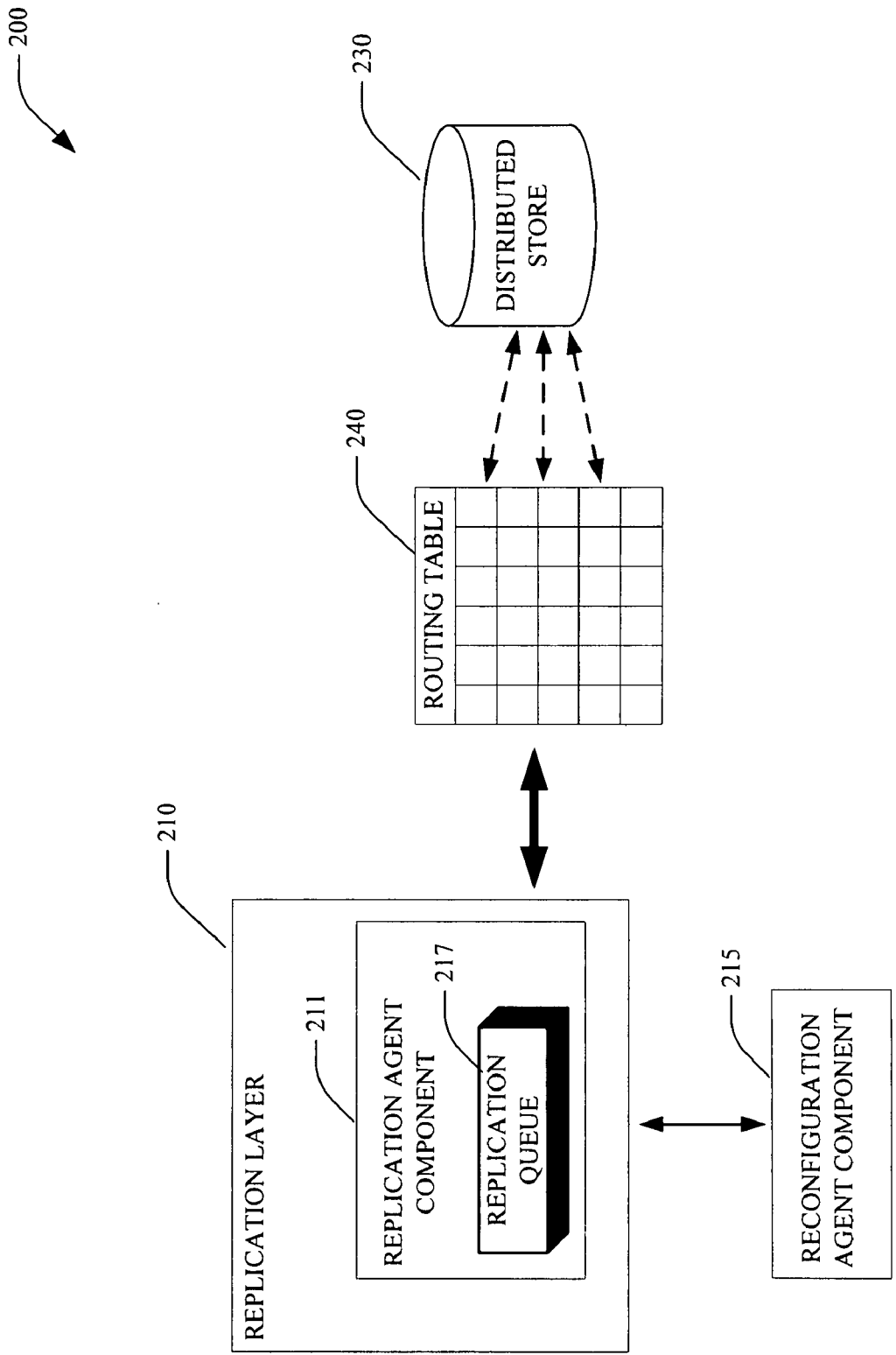
FIG. 2 illustrates an exemplary arrangement of a replication layer according to a further aspect of the subject innovation.

FIG. 2 illustrates a particular arrangement 200 for a replication layer 210 according to a further aspect of the subject innovation. The replication layer 210 further employs a replication agent component 211 and a reconfiguration agent component 215, which facilitate replication of data as part of the distributed store 230. The replication agent component 211 employs a replication queue 217 that includes data items to be replicated, and is called upon by the distributed store 230 when operations that require data replication arrive therein. A routing table 240 can then direct replicated data to one of the nodes in the cluster, which form the distributed store 230. In one aspect, the replication agent component 211 can obtain the data and employ the replication queue 217 for replication to a secondary node(s). Upon receipt of acknowledgement from such secondary node(s), the data can be committed to the distributed store 230. Likewise, the reconfiguration agent component 211 can update information related to configurations of the nodes in the cluster, which form the distributed store 230 (e.g., designations of nodes as primary to reflect most updated version of data, designation of nodes as secondary that represent back ups for the data). For example, the routing table 240 can represent a subset of a partition map, wherein for data items keys are obtained and hashed identifications are mapped into partitions in form of key ranges. One particular description for build of a new replica is described below:

Building A New Replica

When building a new replica, copy operations are typically sent to the replica before it can start to accept normal replication operations. However, during the copy process, the primary does send the replication traffic to the new replica as well, wherein the replication layer 210 will not dispatch the replication operations to the distributed store 230 before all copy operations have been applied, and the replication layer 210 will also not send ACK for any replication operation before all copy operations have been received.

On the primary node, the replication layer 210 can start the copy process by calling the data store to obtain an enumerator of ICopyOperation for the partition to be copied and then start enumerating. In one aspect, a responsibility of the store is to implement such an enumerator. The CAS layer (not shown) can also supply a starting sequence number to the store, with the promise that every replication operation starting from this sequence number will be replicated to the target replica. Alternatively, the store has the responsibility that data entries updated by every replication operation with sequence number less than the starting sequence are to be included in the copy stream. As such, for data entries that are updated by multiple operations, typically the last one has to be included, and multiple operations for the same data entry can be encompassed as long as the receiving side store can handle them correctly.

In general, the distributed store 230 does not send any uncommitted data in the copy stream. For example, if the copy enumerator encounters such an entry, one approach is to delay entry to be committed and then enumerate the committed version. However, the distributed store 230 can desire to avoid such waiting when sequence of the operation is larger or equal to the starting sequence number—(since in such case the entry is already covered by the replication operation anyway and the copy enumerator can simply skip such entry.) To facilitate operation, the replication layer can select the starting sequence number as one plus the sequence number of the last committed operation. For example, if the store implementation adopts the above strategy, it typically need not wait for uncommitted operation. The store can also employ the replication sequence as version number for each entry.

It is to be appreciated that the above description is exemplary in nature and the distributed store does not necessarily have to be implement such method. For example, as long as the enumerator can ensure that the enumeration will not miss any data for operations less than the starting sequence number, the copy behavior can be deemed accurate. The distributed store 230 can further choose to group its copy operation in a manner that every copy operation contains an appropriate amount of data to copy efficiently.

The replication layer 210 can place each copy operation into a copy queue for the target replica after assigning a copy sequence number that also starts from 1, wherein such copy sequence number is in a separate sequence than the normal replication sequence. The copy operation can be sent to the replica in a same manner as a replication operation—e.g., it will use the same connection, and same retry policy as described in the previous section. When the primary receives the ACK for the last copy operation, the copy process is considered to be completed. If during the process the remote replica is down, replication layer 210 will abort the copy process by disposing the enumerator.

Dispatching Operations to Store

The previous two sections described replication on the primary side or primary node. The following describes behavior of a secondary replica or secondary node, and dispatching incoming operations to the distributed store. When a replication message arrives, the replication layer can first dispatch it to the appropriate secondary node based on partition id contained in the message (it is currently encoded in the action string of each replication message). Moreover, when the secondary replica obtains such message, it is responsible for dispatching the incoming operations to the store in order. As mentioned earlier, one can assume no delivery guarantee from the communication layer, hence the incoming traffic can arrive in any order. The replication layer can further place incoming operations in the receiver queue and dispatch the in-order portion to the store.

Operations can be readily ordered, since one can have a sequence for replication operations and another sequence for copy operations. All copy operations can be dispatched earlier than replication operations. Since the sequence number does not have a sequential gap, the replication layer can readily notice whether an operation is ready to be dispatched or not. Additionally, the replication layer on the primary side or node requires including information in the message, which indicates the last copy operation and also the starting sequence number for the replication stream that the secondary should expect. It is noted that copy is a one-time operation and once it is completed the secondary nodes follow operation with replication traffic.

When an in-order operation is received, the secondary node can send an ACK containing the sequence number for the last in-order operation that is received, which can be different from the sequence number that is received for such message. For example, it can be assumed that the receiver side is expecting sequence number 100, yet sequence number 101 arrives earlier. As such, the secondary replica typically has to position 101 to the receiver queue, and yet cannot dispatch or acknowledge it. When sequence 100 does arrive, the replication layer can dispatch both sequence numbers 100 and 101 (in the correct order) and further returns an acknowledgement containing sequence number 101, instead of 100. Moreover, there is no requirement to send separate ACK for 100 and 101 since the ACK of 101 implicitly indicates the ACK of 100. Furthermore, ACK cannot be sent if an out-of-order operation is received, since no guarantee exists that the operations in the gap will ever be received. For example, when the primary fails, the system 200 can discard out-of-order operations on the secondary replica.

In one aspect, the replication layer typically need not wait until the store successfully applies the operation before sending the ACK message to the primary—(e.g., as long as the operation is received, errors are not expected afterwards unless the process fails and hence sending an ACK earlier is safe.) In case of persistent stores the ACK can be delayed until initiated by the replication layer.)

Likewise, in-order operations can further be dispatched to the store in order, wherein a dispatch queue is implemented. On the store side, after an operation is obtained from the queue, it can either complete all the necessary processing before retrieving the next operation from the queue, or at least take a lock on the appropriate data before retrieving and processing the next operation—such that the operations are processed in-order.

In a related aspect, another complexity for in-order processing occurs when a secondary replica transitions into a primary. It should be ensured that every operation in the dispatch queue has been processed (yet CAS cannot ensure accordingly, since CAS can only know whether an operation has been de-queued, and the processing can take an arbitrary long time), or at least locks have been taken, before the store can start processing client requests. To achieve such result, during the transition, a marker operation can be implemented (e.g., a null mark) into the queue and wait until the queue is empty before allowing the replica to actually become the primary. Accordingly, since the store has the responsibility of ensuring that they process the operations in the dispatch queue in-order, the store is ready to process client requests without disrupting the order, even if the processing of the operations have not completed yet.

An enhancement to the replication protocol can include the ability to avoid a complete copy for replicas that has partial data. It is possible that certain store can implement such optimizations. At the replication layer, the store on the secondary side is initially asked to supply information to summarize the data it already has. The replication layer can then pass this information (CAS itself does not need to understand such data) to the primary node, so that the primary is enabled to skip some copy during its enumeration. More generally, the replication can allow the primary and secondary to have several rounds of information exchange before starting the enumeration process. In another example, one can allow ACK messages to contain some information from the secondary to help the store on the primary side to optimize its enumeration (or even normal replication, although it is probably less useful there). Accordingly, CAS replication layer can be absent from such scenario, wherein the distributed store can perform various optimizations as desired.

Figure 3:
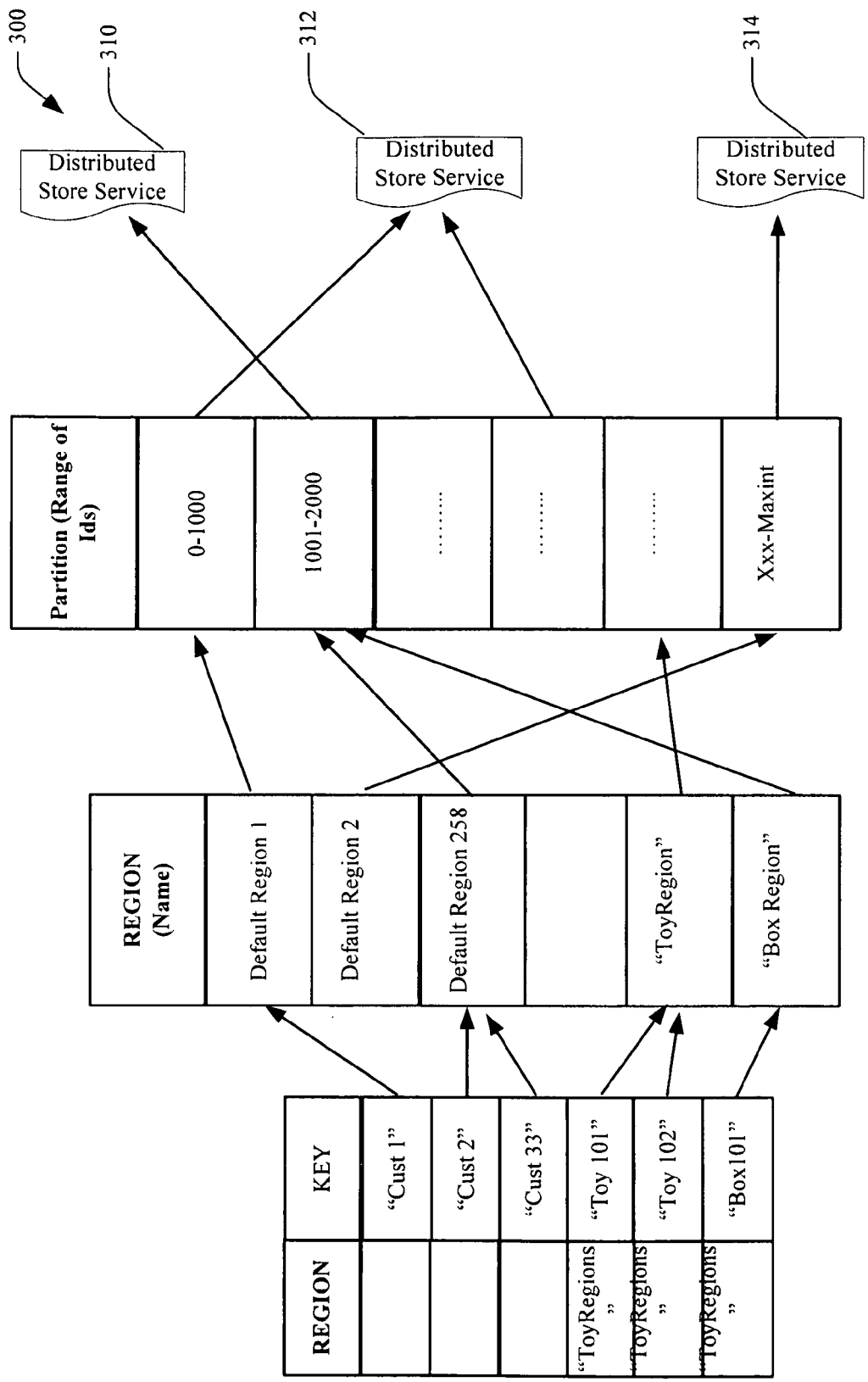
FIG. 3 illustrates a key mapping among regions and portions of a distributed store in accordance with an aspect of the subject innovation.

FIG. 3 illustrates a key mapping 300 for ranges of data when mapped to nodes on a distributed store(s) 310, 312, 314. Based on items to be stored, such as in case of a toy delivery store for boxes corresponding to the toys, two types of regions in form of region and default can be defined—wherein for all data items keys are obtained and hashed identifications mapped into partitions in form of key ranges. Such partitions can further be taken and spread onto different machines that form the distributed store 310, 312, 314. The partition maps can further include both global partition maps and local partition maps. The local partition map can be placed on a node, to supply knowledge about partitions placed on the node. Likewise, the global partition supplies knowledge about all partition maps in the cluster of nodes that form the distributed store. Furthermore, the local cache can maintain items in de-serialized object format and without involving the distributed store. Requests arriving in the local cache can then be synched with primary data being held in the primary node.

Figure 4:
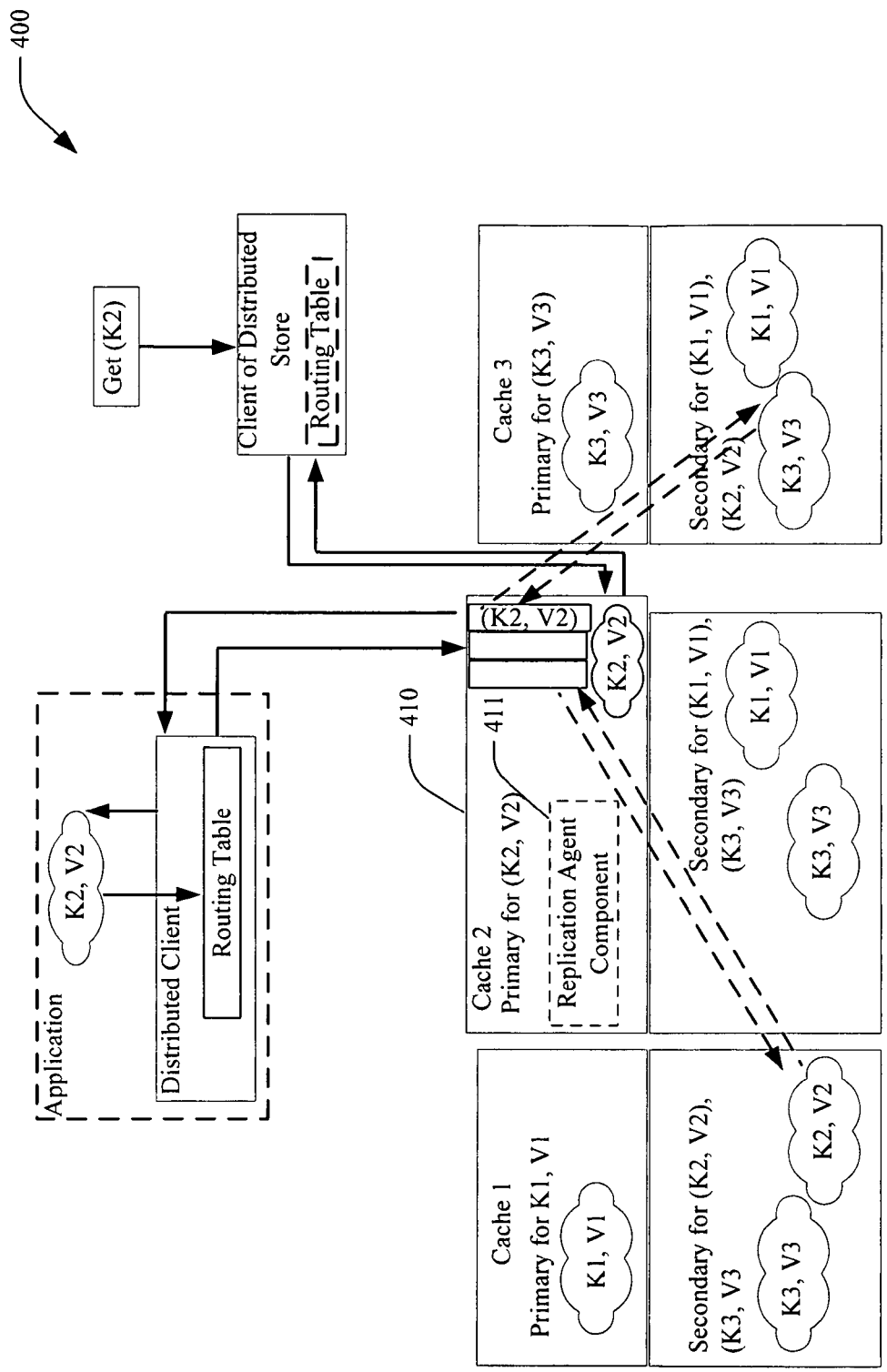
FIG. 4 illustrates an exemplary system that facilitates availability of replications according to an aspect of the subject innovation.

FIG. 4 illustrates replication operation, wherein the replication agent component 411 facilitates sending requests to secondary nodes according to a further aspect of the subject innovation. A request is placed in the queue and for every named cache the number of secondary node replications can be introduced (e.g., based on a desired measure of reliability.)

For example, at cache 2 designated as 410 by using the Routing table—a client of the distributed store routes the "PUT" request for storing/updating data, and places the request to cache 2, which serves as primary node for K2, V2. Such operation can then be propagated to other secondary nodes, wherein upon receiving an acknowledgement for a quorum of nodes, control can then be returned to the client of the distributed store, for example. The replication agent component 411 can employ replication queues for replication of desired data to the secondary nodes. As explained earlier, once data is compacted in the store, such data can be committed on a majority of secondary nodes.

Figure 5:
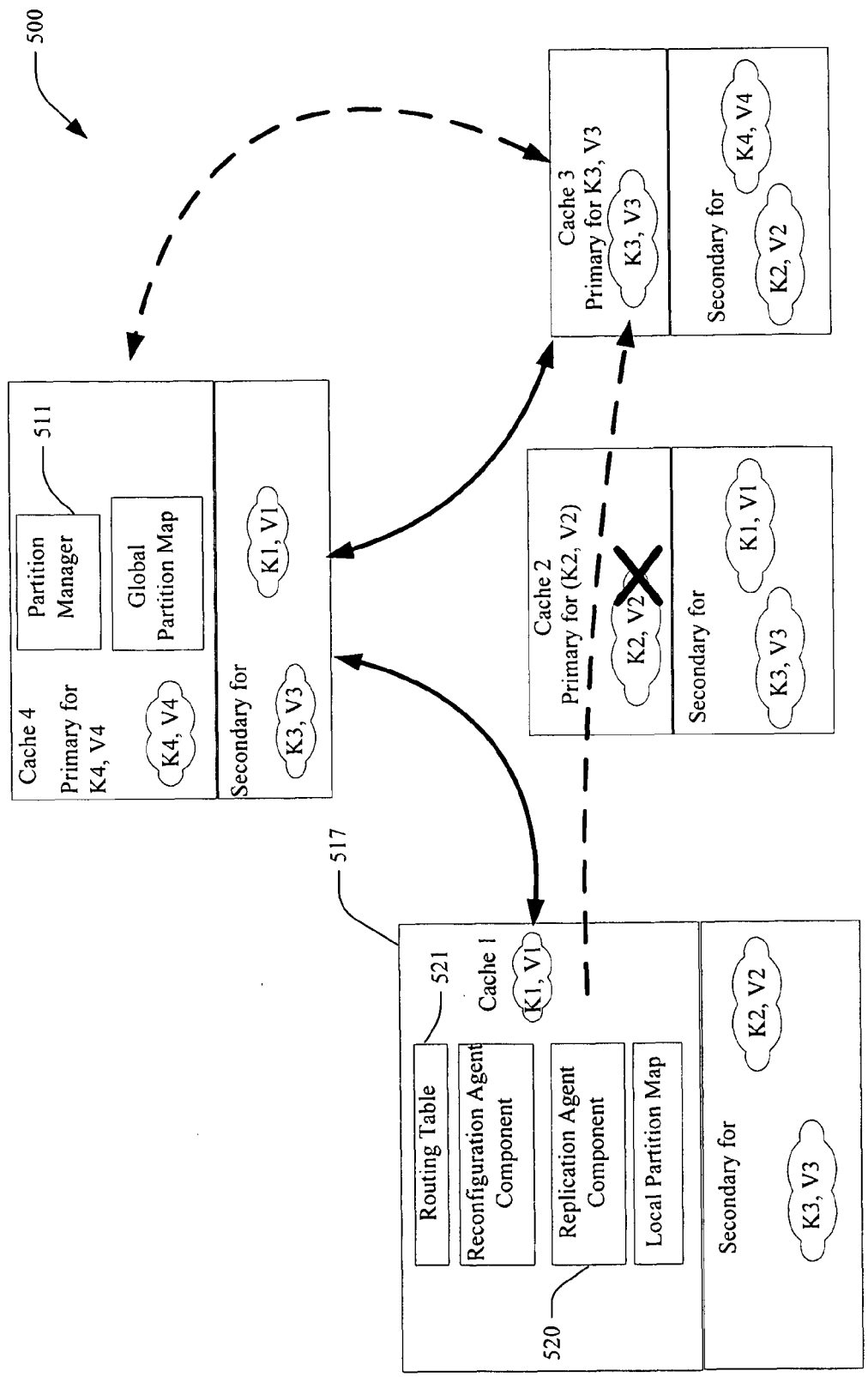
FIG. 5 illustrates a particular aspect for a fail over of replicates in accordance with a particular aspect of the subject innovation.

FIG. 5 illustrates an exemplary management for a fail over of a node designated as part of the distributed cache 500 in accordance with an aspect of the subject innovation. In general, the global partition mapping has knowledge about partitions in the cluster that form the distributed store, and there exists a partition manager 511 for managing operations thereof. At any time, the partition manager 511 can live on one of the nodes associated with the distributed store, and yet can be duplicated on other nodes as desired. When the node including cache 2 fails, the partition manager 511 evaluates the partition map and designates another primary. For example, node 517 containing cache 1 can be selected as the next primary, which then sends messages to all other secondary nodes stating that cache 1 functions as the new primary.

In general, the routing table 521 is aware of the primary node that is the most up-to-date version for such data item in the distributed store. Upon receipt of a request for updating/writing data items already stored in the distributed cache, such request can be pushed back to the replication queue with respective operations logged as part thereof. For example, based on associated costs/feasibility data propagation can be in form of synchronous operations (e.g., reliable data transfer to secondary nodes even in case of node failures) or asynchronous operations (a less reliable data transfer of data to secondary nodes, wherein node failure can result in data loss).

As explained earlier, the replication agent component and the reconfiguration agent component, interact with the replication layer to facilitate replication of data as part of the distributed store. The replication agent component 520 employs a replication queue that includes data items to be replicated, and is called upon by the distributed store when operations that require data replication arrive in the distributed store. The routing table 521 can then direct replicated data to one of the nodes in the cluster, which form the distributed cache. In one aspect, the replication agent component 520 can obtain the data and employ the replication queue for replication to a secondary node(s).

Figure 6:
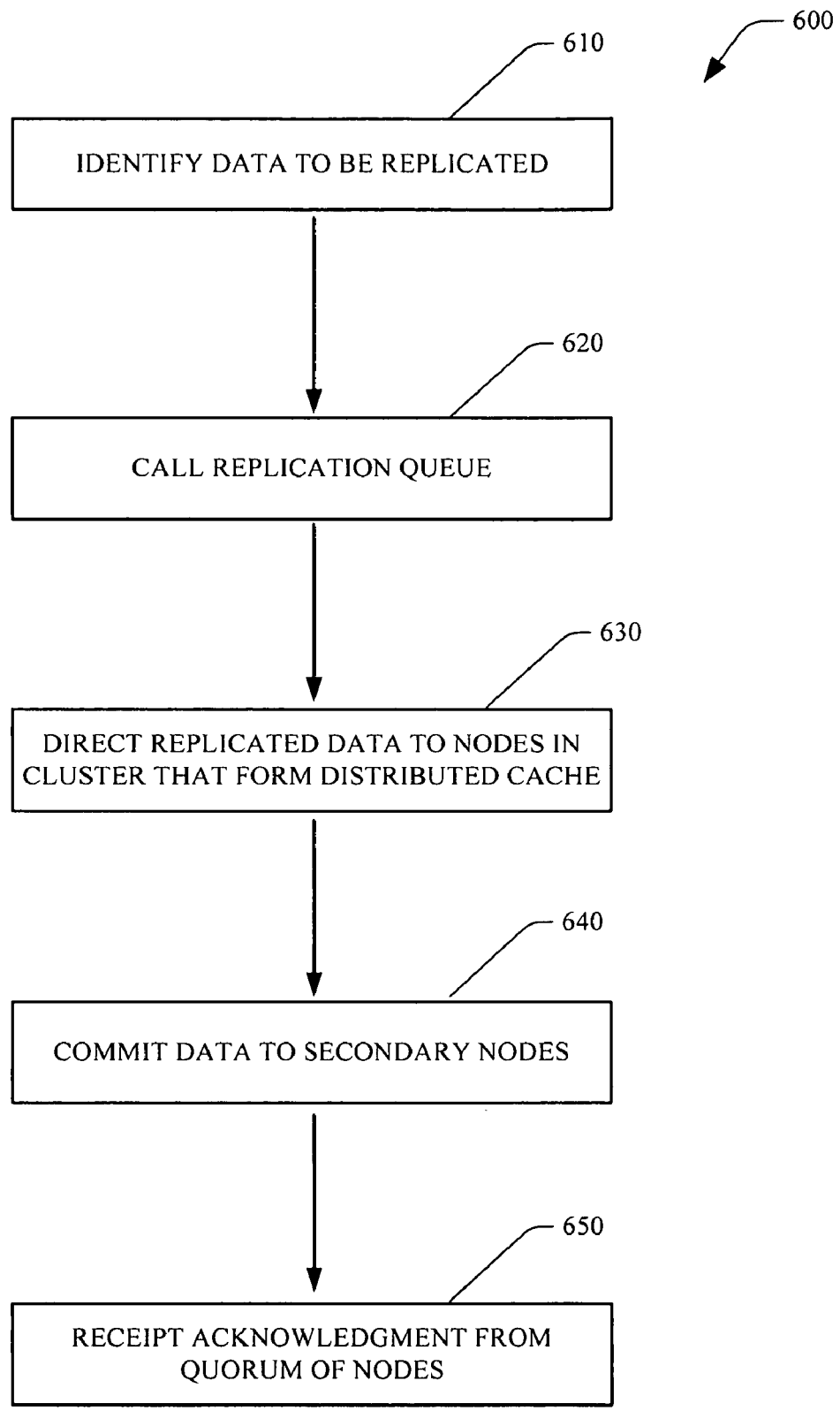
FIG. 6 illustrates a methodology of committing data to secondary nodes in a distributed cache according to an aspect of the subject innovation.
Figure 7:
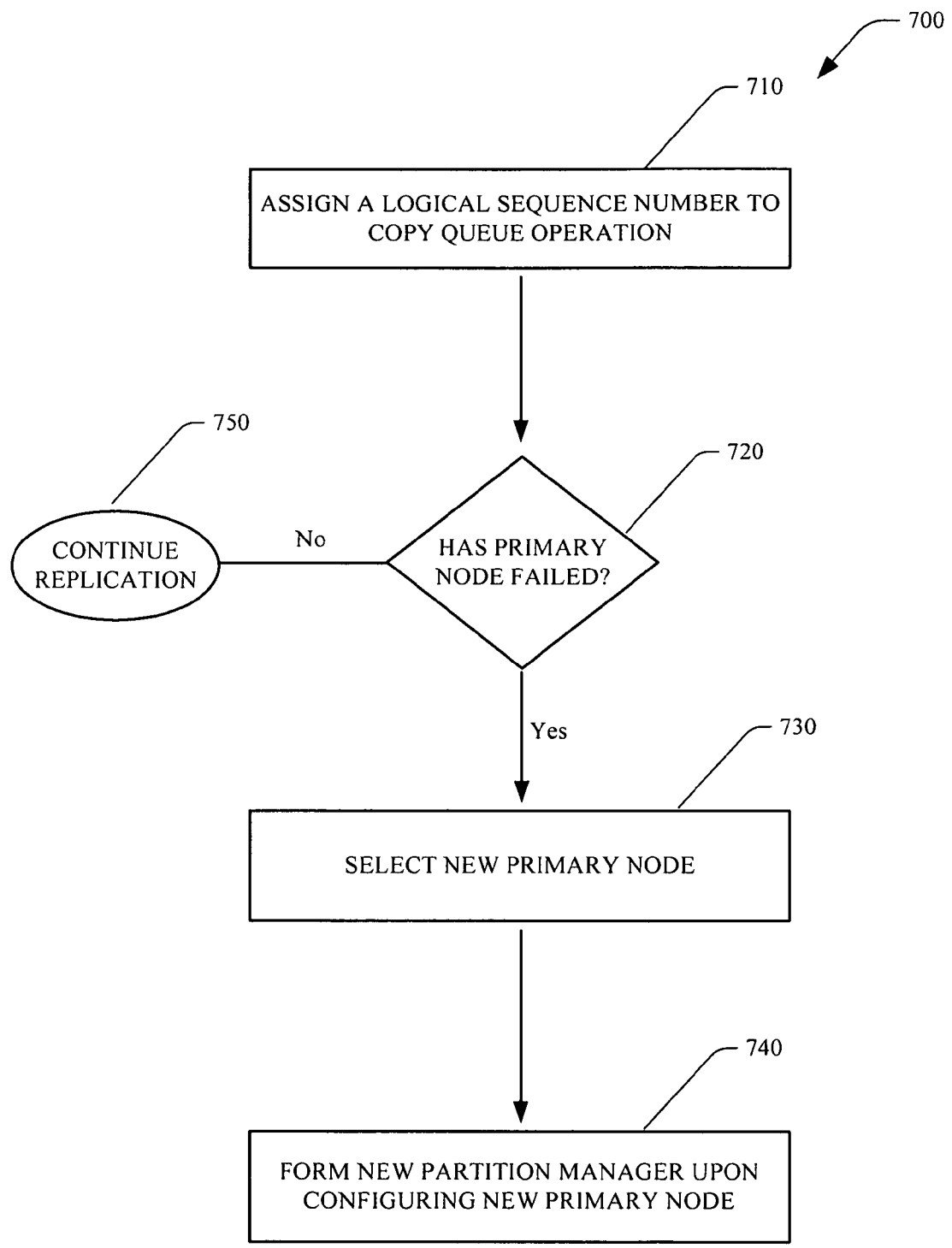
FIG. 7 illustrates a further methodology of writing/updating data to a primary node in accordance with a further aspect.

FIG. 6 illustrates a methodology 600 of replicating data according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 610, data to be replicated can be identified for caching to the distributed store. Subsequently and at 620 the replication queue that includes data items to be replicated can be called upon for replication of data. Subsequently and at 630, a routing table can direct replicated data to a node(s) in the cluster, which in part form the distributed cache. Next, the data can be committed to the store and associated secondary nodes at 640, and an acknowledgement associated therewith received from quorum of such secondary node(s) at 650, FIG. 7 illustrates a related methodology 700 of updating data items in a distributed cache according to a further aspect, wherein the subject innovation enables the system to start enumerating the partition data while the operations are still continuing. Initially and at 710 current sequence number for operations in form of a logical sequence number (LSN) can be set. In general, the routing table is aware of the primary node that is the most up-to-date version for such data item in the distributed store. Next and at 720, a determination is performed as to whether the primary node has failed. If the primary node that stores the data item is still part of the distributed store, the methodology 700 proceeds to act 750 wherein the replication process continues and data can be written to the primary node with such data also being committed to other secondary nodes, for example. Otherwise, the methodology 700 proceeds to act 730, wherein a new primary node can be selected (e.g., another secondary node can be designated as the new primary node for such data.) Subsequently, and at 740 a new partition manager can be formed upon configuring the new primary node. As explained earlier, at any time, the partition manager can live on one of the nodes associated with the distributed store, and yet can be duplicated on other nodes as desired.

Figure 8:
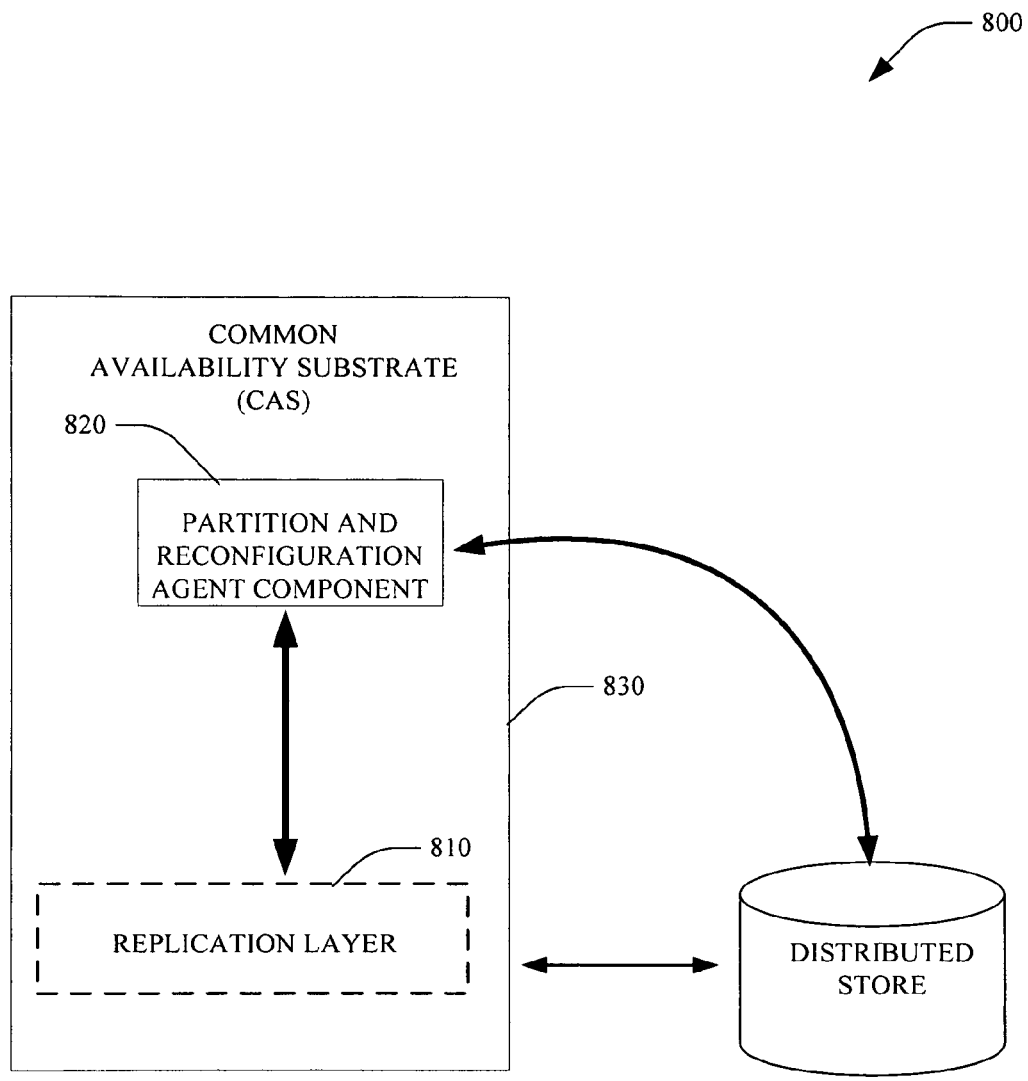
FIG. 8 illustrates a partition and reconfiguration agent component (PARA) that interacts with the common availability substrate according to an aspect of the subject innovation.

FIG. 8 illustrates interaction of a replication layer 810 with a partition and reconfiguration agent component (PARA component) 820 in accordance with an aspect of the subject innovation. In one aspect of the replication process, the PARA component 820 can be considered as the manager of replication layer on each node. In general, from a replication perspective the PARA component 820 can create the appropriate replication layer objects (PrimaryReplica on primary side and SecondaryReplica on secondary side) and further manage their lifecycles. Moreover, the PARA component 820 can provide the PrimaryReplica with the updated configuration information (such as what replicas can be added or removed and which of them can be part of the quorum). Replicas that are not in the quorum can be referred to as "Idle Replica". The replication layer 810 can further provide the PARA component 820 with the sequence number of the last in-order operation that is received. Such can prove beneficial when the primary fails or falls and is required to select a secondary as the new primary. Likewise, when a decision is made to build a new replica, the PARA component 820 can be notified when the copy process is completed. Such can be achieved by employing the async pattern in the API. Moreover, when PARA component 820 performs a reconfiguration, the replication layer 810 can notify PARA component 820 when catch-up is completed, which indicates that every operation that was committed in the previous configuration has also been committed (received ACK from quorum) in the current configuration. After catch-up is completed, the PARA component 820 can perform the next act of reconfiguration. For the swap-primary case, catch-up also needs to wait until the new primary has caught up everything the primary has. For such scenarios, Async pattern can be employed in the API.

In a related aspect, whenever a reconfiguration occurs, a new (higher) epoch can be chosen for the configuration of nodes (e.g., designations as primary nodes or secondary nodes.) For example, if a reconfiguration initiates because the old primary is down, it is required to ensure that after selecting the new primary from the most advanced secondary, no replication operation from the old primary is accepted anymore—(such condition eliminates conflict with operations from the new primary with the same sequence number.) Accordingly, when a secondary is asked for the latest sequence number, the PARA component 820 can pass the new epoch to the secondary replicas and each secondary will have to remember that only replication operations with the same or higher epoch can be accepted. Hence, operations from the old primary can be ensured to be discarded by all replicas after the new primary is selected.

Moreover and as explained earlier, during a reconfiguration a secondary replica can become primary. When such occurs, the replication layer can copy operations in the receiver queue to the sender queue so that it can catch-up other replicas that are behind. However, if there are some replicas that are too far behind wherein what is available in the queue is not sufficient to catch up with them, such replicas will be marked as down. Similarly, a primary replica can transition into a secondary (during swap-primary), and in such case operations in the sender queue will be copied to the receiver queue.

Common Queue Data Structure

In one aspect, various commonalities exist among the queues (except for the dispatch queue). This can include features such as when operations in the queue are sequenced. Moreover, the operations can be placed into the queue out-of-order in terms of their sequence number, wherein on the receiving side in-order delivery from the communication layer Is not assumed. As such, whether the sender side supplies operations in order becomes relatively unimportant, and hence the store can be enabled to push replication operations out-of-order too.

In a related aspect, operations typically are required to be completed after being placed in the queue. As such, operations can be labeled as "complete" to indicate ACK has been received from every replica. For the sender queue (including both the replication queue and copy queue), such represents that ACK has been received from the corresponding replica. Moreover, for the receiver queue (both replication and copy), such indicates that the operation has been processed by the store. In one aspect, since the store will not fail to apply the operation, such condition can relax to indicate that once the operation is ready to be dispatched (and all earlier operations have been received), it is completed. It is to be appreciated that although the operation can be positioned into the queue out-of-order, they can also all be completed in-order.

It can be desired to limit the size of each queue (e.g., from a memory consumption perspective.) At the same time, on the sender side such can further benefit providing control flow to avoid overflowing the communication layer, which is important for the copy operations since the copy enumeration can generate substantial traffic in a short period of time. For both the store operation queue and the receiver replication queue, the operation can be maintained temporarily (e.g., a capacity-based eviction policy) after the operation is completed. For the other queues, one can release (de-queue) the operation once it is completed.

Hence, it is desirable to have a common data structure (class) for the different queues and abstract out the notion of "completing an operation". Such can be chosen to employ cyclic buffer as the core data structure for the queue, since it can map naturally with the sequence number of an operation—and perform efficiently (e.g., it does not deal with memory allocation/de-allocation—unless one requires to automatically expand/shrink the queue size).

For example, sequences of an operation can determine its slot in the queue by a simple shift instruction (e.g., it can be required that the size of the queue to be the power of 2). In addition to the buffer, one can keep track of the "head", which contains the sequence number of the first uncompleted operation in the queue (e.g., not have been placed into the queue yet), and a "tail" which contains the sequence number of the last operation in the queue.

When an operation is put into the queue, one can typically update the tail (unless an operation with larger sequence number is already in the queue) and when an operation is completed, the head can be incremented. Furthermore, one can readily check whether the queue is full; so as to reject an operation to be placed in the queue.

For example, if such is used directly, a queue to store replication or copy operation can only address part of involved challenges, since such operation is created by the store and will not have any CAS logic associated therewith. To supply this logic, the replication layer can further define another internal abstraction referred to as "OperationContainer", which can wrap an external operation and provide the kind of replication logic required to associate with the operation. Typically, the container decides what needs to be done when an operation is being completed. For example, upon completion of an operation in the receiver copy queue and receiver replication queue, a dispatch queue can be implemented. Such can be released in the copy queue but kept in the replication queue until the next operation arrives in at the same slot. For instance, such logic can be provided by the respective container for copy and replication operations.

When a queue is created, one can further create the appropriate type of OperationContainer for each slot in the queue. Moreover, a container can be associated with the operation put into the queue at the corresponding slot. Although the operation arrives/leaves at any given slot, the container can remain the same to avoid extra memory management.

Replication States on Primary

The primary node/primary side can maintain track of all the replicas associated therewith. Moreover, each replica can contain a sender side replication queue and a copy queue, for example. For the primary replica, substantially all states required for maintaining is already captured in the collection of the replication queues—(e.g., from each queue the primary knows what the last acknowledged sequence is for that replica, wherein operations are acknowledged in sequence). Moreover, if the replicas are sorted by their last acknowledged sequence, the minimum value indicates what store operations have been completed. Similarly, if one observes at the replica that represents the quorum (based on the size of the quorum one can further calculate the index of such replica in the sorted list), and can further determine what operations have been committed. It is to be appreciated that some replicas are idle, which indicates that they are not in the current configuration. Such replicas can further be considered when determining the last completed operation but not for determining the last committed operation.

For each replica, the replication layer typically knows about their address, whether the replica is up or down (e.g., operations are not sent to a replica that is down) and whether the replica is idle or in the current configuration. The PARA component 820 can further inform the replication layer about replica state changes. The PARA component 820 can also add an idle replica (e.g., a new replica is not added directly as a secondary, as it has to be built first and then become a secondary) and the replication layer typically knows that the build is complete when the replica has completed all operations in its copy queue.

Moreover, the PARA component 820 can decide to change the role of existing replicas (represented by reconfiguration from the failover perspective). In one aspect, if a replica is no longer needed, the replication layer can remove it from its collection. Likewise, when the roles are changed, the replication layer needs to check again what store operations are committed and completed in the new configuration. During such transition, some operations that have already reached quorum in the old configuration can fall below quorum in the new configuration. As such, a catch-up period can be defined from the start of the reconfiguration until such operations re-gain quorum in the new configuration. Typically catch-up can be completed before the PARA component 820 can proceed to the later stages of the reconfiguration protocol. It is to be appreciated that during catch-up, the store can continue to accept write operations and the replication layer can continue to replicate the new operations except for the swap primary case where the old primary has to stop from accepting new updates in order for the new primary to catch up. Furthermore, for read requests, if the primary has not changed, the store can also accept read requests during the catch-up period, since it is guaranteed that it has the latest data and it still has locks on hold for operations that have not been committed.

If the primary node is new, such node typically rejects read requests until catch-up is completed, because the new primary does not have locks for operations that have not reached quorum. Accordingly, it will have to ensure that every operation it has applied to its store is committed in the new configuration before it allows the data affected by these operation to be read by the client—otherwise, errors can be introduced since data loss can happen when the new primary is down and a read quorum of replicas still exist.

Replication States on Secondary

The secondary replica can require maintaining the receiver replication queue and a copy queue, for example. Moreover, if copy is in progress, it also needs to extract the starting replication sequence from the copy operations and for each incoming copy operation check whether it is the last copy operation—so that it can know whether the copy process can be completed. Furthermore, an epoch state can also be maintained, wherein replication operations with the same or higher epoch can be accepted by the secondary. When a secondary replica is first created, the PARA component 820 can supply the current configuration epoch to the secondary. Thereafter, it can be updated when the primary is down and a new primary needs to be elected. During the election, a new, higher configuration epoch will be determined by the Partition Manager and passed to the secondary replica via the PARA component 820. The secondary replica needs to discard any out-of-order portion in its receiver replication queue, and supply the sequence number for the last completed replication operation (so that the new primary can be chosen from the replica that has the highest sequence), followed by updating its epoch. Subsequently, even if replication traffic from the old primary arrives, the secondary will reject it as it typically contains the old epoch, which is lower than its current epoch.

Figure 9:
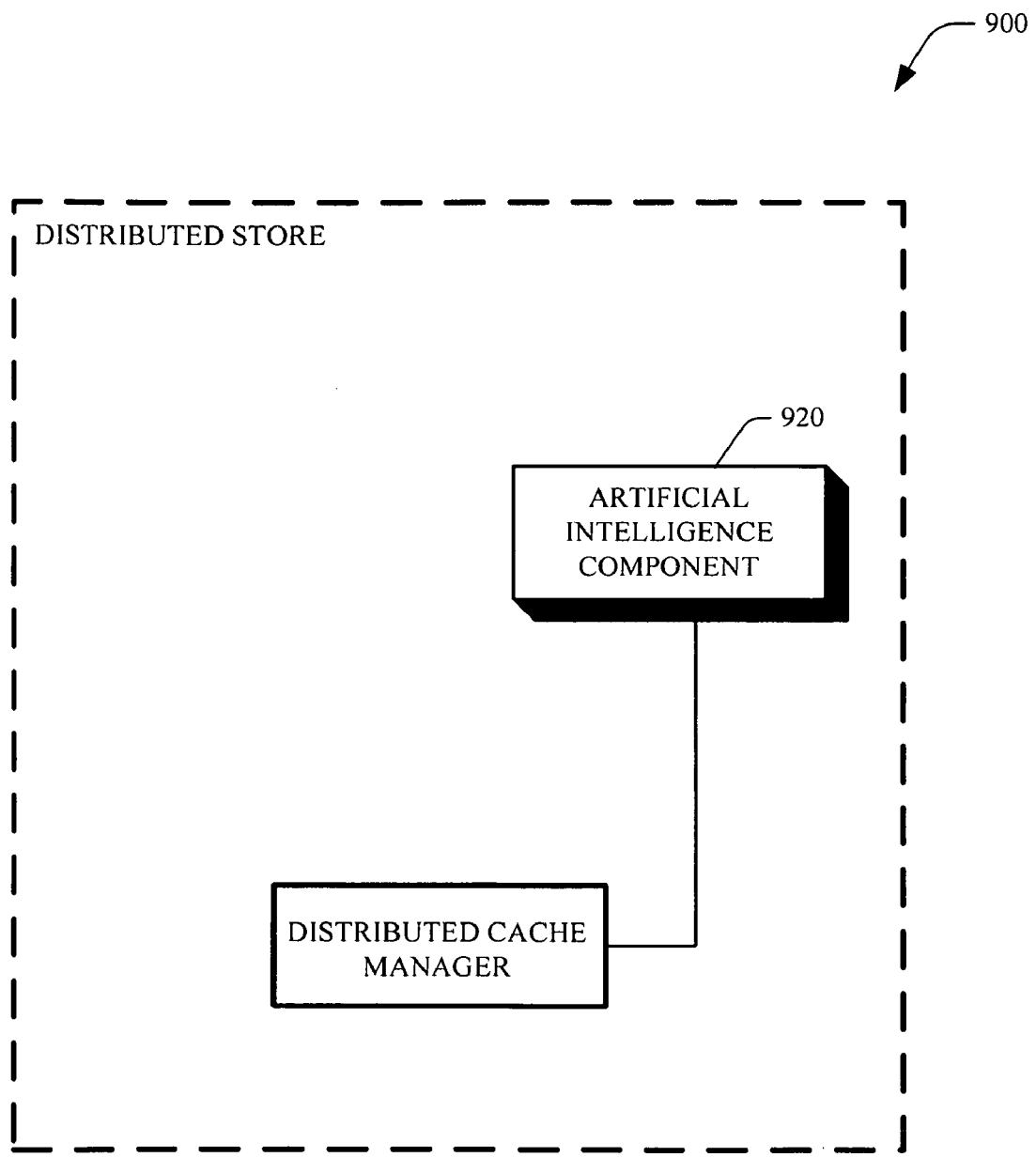
FIG. 9 illustrates an inference component that facilitates inferring and/or determining when, where, how to replicate data in a distributed store according to an aspect of the subject innovation.

FIG. 9 illustrates an inference component in form of an artificial intelligence (AI) component 920 that can be employed to facilitate inferring and/or determining when, where, how to replicate data in the distributed cache and/or distribute applications. For example, the artificial intelligence component 920 can supply additional analysis with the distributed cache manager to improve distribution and/or scaling of the system. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 920 can employ any of a variety of suitable AI-based schemes as described supra in connection with facilitating various aspects of the herein described invention. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\text{confidence(class)}$.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
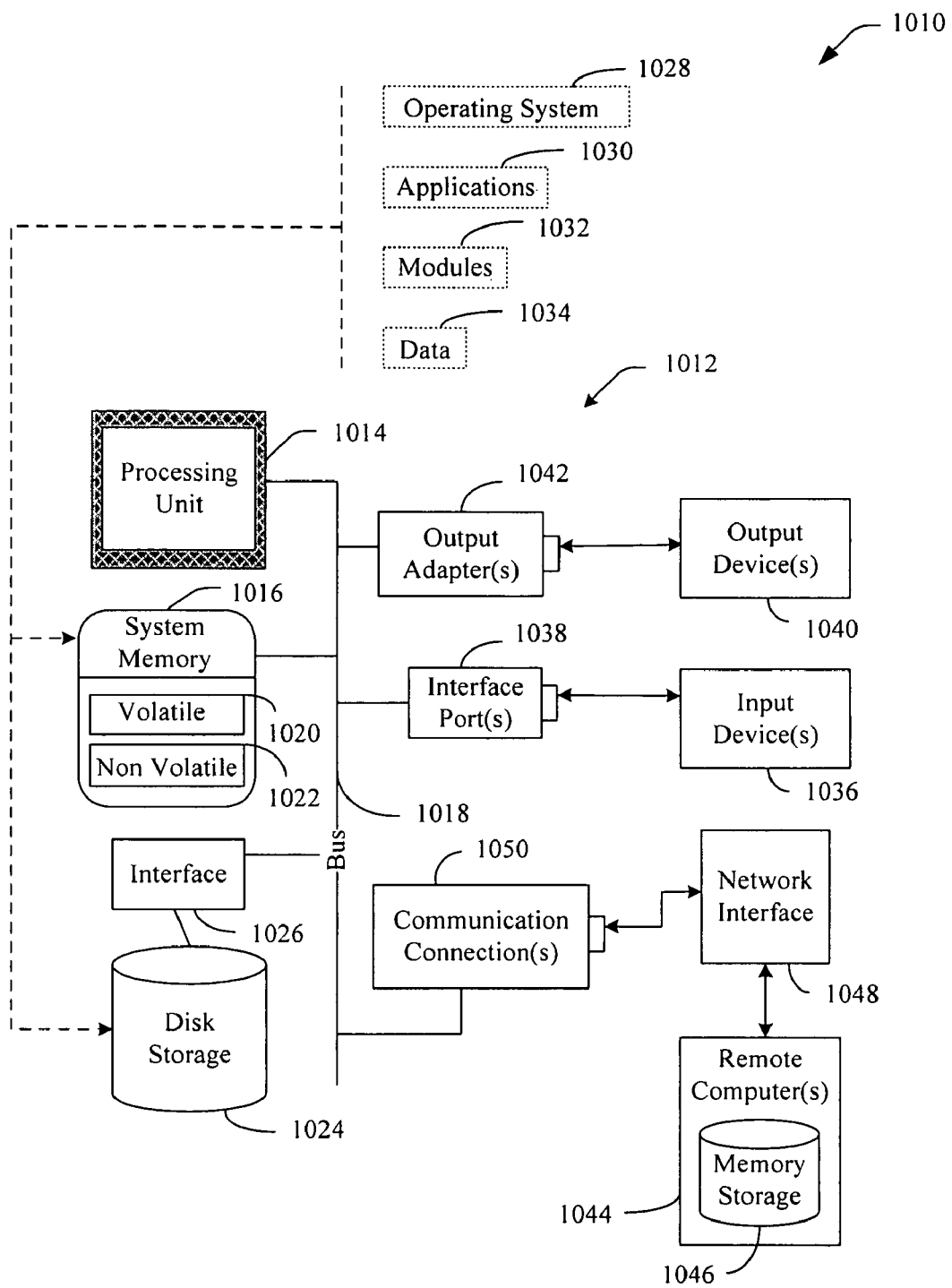
FIG. 10 illustrates an exemplary environment for implementing various aspects of the subject innovation.
Figure 11:
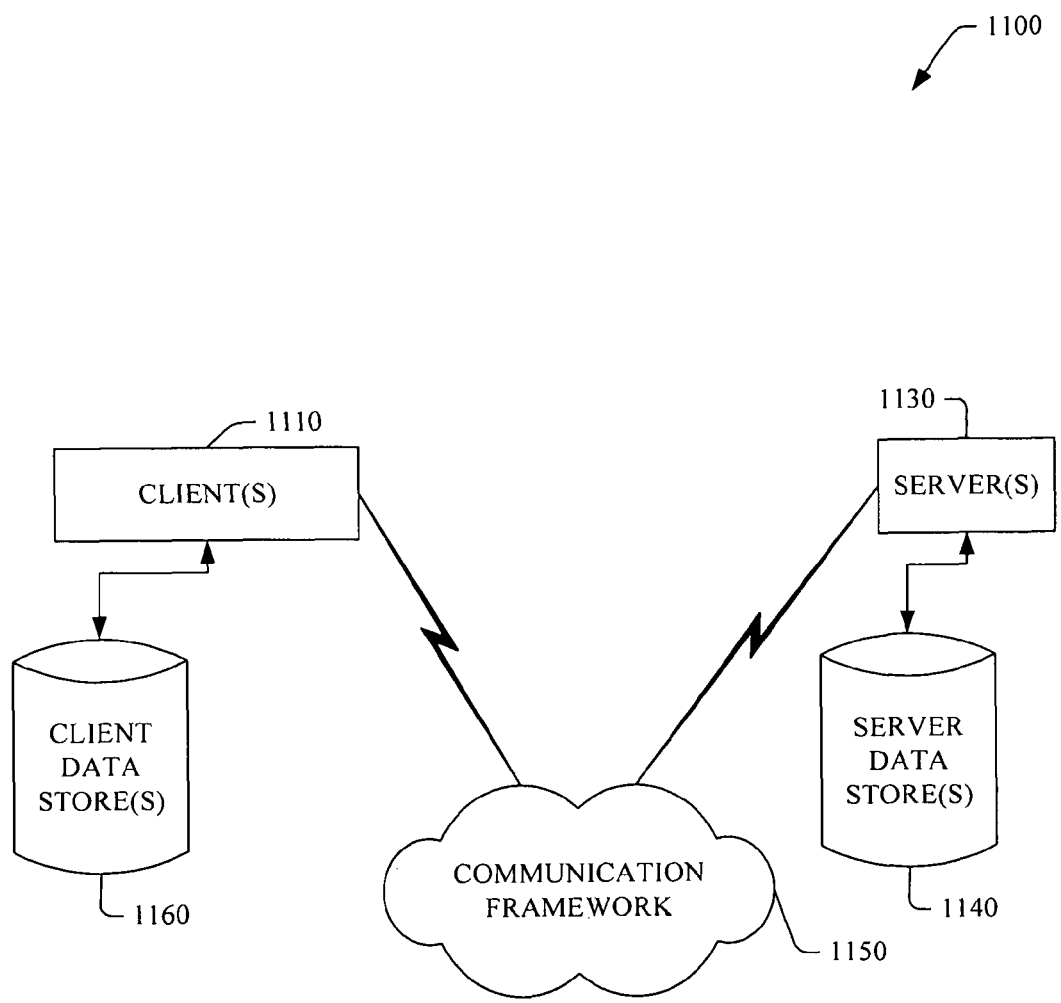
FIG. 11 is a schematic block diagram of a sample-computing environment that can be employed for data replication according to a further aspect of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for replicating cache according to an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method comprising:
   employing a processor to execute computer executable instructions stored on a computer readable medium to perform the following acts:
   by a replication layer on a primary node of a cluster of nodes connected together and forming a distributed store, starting an enumeration for replication of a partition of the distributed store;
   employing a Common Availability Substrate (CAS) layer to provide a starting sequence number for the enumeration;
   delaying enumeration of any uncommitted data entry in a copy stream associated with the replication;
   based on a delayed uncommitted data entry becoming committed, enumerating the committed data entry;
   by the distributed store, employing a replication sequence corresponding to the enumeration as version numbers for committed data entries; and
   by the primary node, receiving an acknowledgement of a last copy operation associated with the replication.

2. The computer implemented method of claim 1 further comprising managing life cycle of the nodes by the CAS.

3. The computer implemented method of claim 1 further comprising queuing data for replicating.

4. The computer implemented method of claim 3 further comprising maintain availability of operations for the distributed data store during the replication.

5. The computer implemented method of claim 3 further comprising receiving an acknowledgement from a quorum of nodes.

6. The computer implemented method of claim 3 further comprising representing a subset of partitions associated with the cluster of nodes as a partition map.

7. The computer implemented method of claim 3 further comprising calling a replication queue.

8. The computer implemented method of claim 3 further comprising notifying other nodes regarding the transiting act.

9. The computer implemented method of claim 1 further comprising designating the primary node in the cluster of nodes to indicate a most updated version for data to be replicated.

10. The computer implemented method of claim 1 further comprising transiting a status of a node from a secondary into a primary node.

11. The computer implemented method of claim 1 further comprising committing data in the secondary node.

12. A computer implemented system that facilitates replication of data comprising:
   a processor;
   a memory communicatively coupled to the processor, the memory having stored therein computer-executable instructions configured to implement the computer implemented system including:
   a plurality of nodes that form a distributed store;
   a Common Availability Substrate (CAS) configured to provide a starting sequence number for an enumeration associated with replication of a partition of the distributed store; and
   a replication layer on a primary node of the plurality of nodes, the replication layer configured to replicate data to various nodes of the distributed store, at least in part by starting an enumeration for the replication of the partition;
   the distributed store being configured to
   delay enumeration of any uncommitted data entry in a copy stream associated with the replication, and based on a delayed uncommitted data entry becoming committed, enumerate the committed data entry, and employ a replication sequence corresponding to the enumeration as version numbers for committed data entries; and the primary node being configured to receive an acknowledgement of a last copy operation associated with the replication.

13. The computer implemented system of claim 12, the replication layer further comprising a replication agent component configured to employ a replication queue for commit of data to secondary nodes.

14. The computer implemented system of claim 12, further comprising a routing table configured to direct replicated data to the plurality of nodes.

15. The computer implemented system of claim 12 further comprising a reconfiguration agent component configured to manage configurations for the plurality of nodes in the distributed store.

16. The computer implemented system of claim 12 further comprising a partition and reconfiguration agent component configured to manage the replication layer for each node.

17. The computer implemented system of claim 12, the replication layer comprising one of asynchronous replication features, or synchronous replication features.

18. The computer implemented system of claim 17 further comprising a logical sequence number (LSN) for replication order, implementable as part of the replication layer.

19. The computer implemented system of claim 12 further comprising an inference component that facilitates data replication in the distributed store.

20. One or more computer-readable storage media storing instructions, the instructions configured to, in response to execution by one or more computing devices, cause operations comprising:
- by a replication layer on a primary node of a cluster of nodes connected together and forming a distributed store, starting an enumeration for replication of a partition of the distributed store;
- employing a Common Availability Substrate (CAS) layer to provide a starting sequence number for the enumeration;
- delaying enumeration of any uncommitted data entry in a copy stream associated with the replication;
- based on a delayed uncommitted data entry becoming committed, enumerating the committed data entry;
- by the distributed store, employing a replication sequence corresponding to the enumeration as version numbers for committed data entries; and
- by the primary node, receiving an acknowledgement of a last copy operation associated with the replication.

* * * * *

UNITED STATES PATENT AND TRADEMARK OFFICE
CERTIFICATE OF CORRECTION

| | | |
|---|---|---|
| PATENT NO. | : 8,117,156 B2 | Page 1 of 1 |
| APPLICATION NO. | : 12/420364 | |
| DATED | : February 14, 2012 | |
| INVENTOR(S) | : Krishnaprasad et al. | |

It is certified that error appears in the above-identified patent and that said Letters Patent is hereby corrected as shown below:

In the Claims

Column 19, line 65, Claim 1, delete "computer executable" and insert -- computer-executable --, therefor.

Signed and Sealed this
Third Day of February, 2015

Michelle K. Lee
*Deputy Director of the United States Patent and Trademark Office*